United States Patent
Kinle et al.

(10) Patent No.: US 10,871,236 B2
(45) Date of Patent: Dec. 22, 2020

(54) FLUID SWITCH-OVER DEVICE AND SANITARY SHOWER DEVICE

(71) Applicant: Hansgrohe SE, Schiltach (DE)

(72) Inventors: Ulrich Kinle, Schenkenzell (DE); Fabian Melle, Ortenberg (DE); Markus Schultis, Steinach (DE)

(73) Assignee: Hansgrohe SE, Schiltach (DE)

( * ) Notice: Subject to any disclaimer, the term of this patent is extended or adjusted under 35 U.S.C. 154(b) by 24 days.

(21) Appl. No.: 16/133,680

(22) Filed: Sep. 17, 2018

(65) Prior Publication Data

US 2019/0085990 A1   Mar. 21, 2019

(30) Foreign Application Priority Data

Sep. 18, 2017 (DE) .......................... 10 2017 216 491

(51) Int. Cl.
*F16K 11/074* (2006.01)
*F16K 31/53* (2006.01)
(Continued)

(52) U.S. Cl.
CPC ............ *F16K 11/074* (2013.01); *B05B 1/169* (2013.01); *B05B 1/1636* (2013.01); *B05B 1/18* (2013.01);
(Continued)

(58) Field of Classification Search
CPC ....... B05B 1/1636; B05B 1/18; B05B 12/002; B05B 12/04; F16K 11/074; F16K 31/53; Y10T 137/86493
See application file for complete search history.

(56) References Cited

U.S. PATENT DOCUMENTS 6,325,099 B1 * 12/2001 Bunschoten ......... B67D 1/0832
137/614.04
8,474,482 B2    7/2013 Melle
(Continued)

FOREIGN PATENT DOCUMENTS

CA    2341041 A1 *  3/2000 ............. B05B 1/185
CN    101793331 A    8/2010
(Continued)

OTHER PUBLICATIONS

Search Report issued by the European Patent Office, Munich, Germany, dated Feb. 12, 2019, for European Application No. 18193618.8.
(Continued)

*Primary Examiner* — Kevin R Barss
(74) *Attorney, Agent, or Firm* — Faegre Drinker Biddle & Reath LLP

(57) ABSTRACT

A fluid switch-over device illustratively for use in a sanitary shower device, including at least one fluid inlet, at least two fluid outlets, and a movable switch-over body for controlling fluid connections of the at least two fluid outlets to the at least one fluid inlet. The switch-over body is switchable between at least three different operating positions. An actuation device is configured for sequential and bidirectional switching-over actuation of the switch-over body both in a forward switch-over direction and in a backward switch-over direction inverse to the forward switch-over direction. The actuation device illustratively includes a first actuation unit for sequential switching-over actuation of the switch-over body in the forward switch-over direction and a second actuation unit for sequential switching-over actuation of the switch-over body in the backward switch-over direction, wherein the two actuation units comprise operat- (Continued)

ing elements that are user-operable independently of each other.

18 Claims, 5 Drawing Sheets

(51) Int. Cl.
    *B05B 1/16*     (2006.01)
    *B05B 12/00*    (2018.01)
    *B05B 1/18*     (2006.01)
    *B05B 12/04*    (2006.01)

(52) U.S. Cl.
    CPC ............ *B05B 12/002* (2013.01); *B05B 12/04* (2013.01); *F16K 31/53* (2013.01)

(56) References Cited

U.S. PATENT DOCUMENTS

| | | | |
|---|---|---|---|
| 2008/0087746 A1* | 4/2008 | Meisner | B05B 1/1645 239/436 |
| 2010/0155639 A1 | 6/2010 | Zhou | |
| 2010/0193721 A1 | 8/2010 | Melle et al. | |
| 2013/0327431 A1 | 12/2013 | Zhou et al. | |
| 2014/0027234 A1 | 1/2014 | Zhou et al. | |
| 2015/0238984 A1* | 8/2015 | Lee | B05B 1/1609 239/447 |
| 2016/0221006 A1 | 8/2016 | Lin et al. | |
| 2017/0100728 A1 | 4/2017 | Gong et al. | |
| 2017/0320072 A1 | 11/2017 | Zheng et al. | |

FOREIGN PATENT DOCUMENTS

| | | |
|---|---|---|
| CN | 102688816 B | 9/2012 |
| CN | 102728506 A | 10/2012 |
| CN | 104279355 A | 1/2015 |
| CN | 105750104 A | 7/2016 |
| CN | 205731689 U | 11/2016 |
| CN | 206152999 U | 5/2017 |
| DE | 102006020765 A1 | 11/2007 |
| DE | 102009008194 B4 | 7/2011 |
| EP | 3053655 A1 | 8/2016 |
| JP | 2002165719 A | 6/2002 |
| RU | 2015112013 | 10/2016 |

OTHER PUBLICATIONS

Letter Exam Report issued by the German Patent Office, dated Jun. 11, 2018, for German Application No. 10 2017 216 491.3; 5 pages.
Search Report issued by the Russian Federation, dated Apr. 3, 2019, for Russian Application No. 2015112013, 6 pages.
English translation and in Chinese language of First Office Action issued by the National Intellectual Property Administration, P.R. China, dated Jun. 1, 2020, for Chinese Patent Application No. 201811087546.X ; 21 pages.

* cited by examiner

FLUID SWITCH-OVER DEVICE AND SANITARY SHOWER DEVICE

CROSS-REFERENCE TO RELATED APPLICATION

This application claims priority to German Patent Application No. DE 10 2017 216 491.3, filed on Sep. 18, 2017, the disclosure of which is expressly incorporated herein by reference.

BACKGROUND AND SUMMARY OF THE DISCLOSURE

The invention relates to a fluid switch-over device, illustratively for a sanitary water discharge faucet, including at least one fluid inlet, at least two fluid outlets, a movable switch-over body for controlling fluid connections of the at least two fluid outlets to the at least one fluid inlet, wherein the switch-over body is switchable between at least three different operating positions, and an actuation device which is configured for sequential and bidirectional switching-over actuation of the switch-over body both in a forward switch-over direction and in a backward switch-over direction inverse to the forward switch-over direction. The invention further relates to a sanitary shower device equipped with such illustrative fluid switch-over device. The two switch-over directions in forward and backward directions, respectively, may illustratively be rotation directions, such as a clockwise and counter-clockwise rotation or, alternatively, inverse transverse or translational directions, i.e. back and forth movements.

In this context, the term "operating positions" should be taken to mean discrete stably settable positions of the movable switch-over body, in which in each case it provides a desired fluid connection configuration for its at least two fluid outlets with its at least one fluid inlet. In its illustrative three or more operating positions, the switch-over body establishes correspondingly different fluid connection configurations for the two or more fluid outlets with the at least one fluid inlet: for example, the fluid connection from a respective fluid outlet to the fluid inlet can be completely open, partially open or completely shut off. Thus, for example, in the case of two fluid outlets and one fluid inlet, the fluid connection from the fluid inlet can be open to one fluid outlet and shut off to the other in a first operating position of the switch-over body, the fluid connection to both fluid outlets can be open in a second operating position, and the fluid connection can be shut off to one fluid outlet and open to the other fluid outlet in a third operating position. Or the fluid connection from the fluid inlet can be completely open to one fluid outlet and completely shut off to the other fluid outlet in a first operating position of the switch-over body, the fluid connection from the fluid inlet can be completely shut off to one fluid outlet and completely open to the other fluid outlet in a second operating position, and the fluid connection from the fluid inlet to both fluid outlets can be shut off completely or at least partially in a third operating position.

Fluid switch-over devices of this kind are used for sanitary water discharge faucets, for example, in order to enable the user to switch between a plurality of fluidically parallel water outlets, with the result that water supplied emerges in a controllable manner, e.g. from just one or from a desired combination or from none of the available water outlets. This can be used, in the case of sanitary shower devices, for example, to set different types of shower jet.

Accordingly, the invention also relates to a sanitary shower device which has a shower housing having a shower inlet and a shower head including at least two groups of shower jet output openings arranged fluidically in parallel and comprises a fluid switch-over device of this kind.

In the case of fluid switch-over devices of a unidirectional progressive switching type, the switch-over body is progressively switched sequentially and cyclically in one direction from its instantaneous operating position to a successive operating position. For this purpose, the switch-over body can be rotatable about a rotation axis, for example, wherein the various operating positions of the body correspond to different rotation angle positions into which it can be rotated. This can be implemented as a pure rotary movement or as a combined axial and rotary movement, the latter option often using a suitable sliding guide resembling a ballpoint pen mechanism. A fluid switch-over device of this kind and the use thereof in a hand-held shower device for setting different types of shower jet is disclosed in patent publication DE 10 2009 008 194 B4, for example. A pushbutton is used there as an operating element. For this progressive switching type, the use of a ratchet mechanism with a ratchet wheel is also known, said wheel typically having a sawtooth profile, see, for example, laid-open publications EP 3 053 655 A1 and US 2017/0100728 A1. In the case of the switch-over devices of the progressive switching type, a relatively large number of individual switch-over operations is often necessary to set a desired operating position for the switch-over body, especially in cases with a relatively large number of possible operating positions. Thus, for example, switching over or switching back from an instantaneous operating position to an operating position set immediately before requires three individual switch-over operations in the case of four operating positions that can be switched cyclically and four individual switch-over operations in the case of five operating positions.

As an alternative, the switch-over device type considered above can be switched bidirectionally in a forward and backward direction. In comparison with the unidirectionally switchable progressive switching type, this reduces the number of individual switching operations required. A corresponding fluid switch-over device of the type stated at the outset and a multifunction hand shower device equipped therewith are disclosed in laid-open publication DE 10 2006 020 765 A1. In the case of the fluid switch-over device there, the actuation device includes an actuation unit having a disc-shaped rotary wheel, which has a through opening and which can be rotated by the user by means of a segment of the circumference of the rotary wheel which protrudes from a housing slot of the hand-held shower device to allow user operation. The fluid inlet of the switch-over device has a half-ring-shaped cross section, along which the through opening can be moved by rotation of the rotary wheel in order to bring the fluid inlet into fluid connection with one of three fluid outlets of the switch-over device in each case.

It is an object of the invention to provide a fluid switch-over device of the type stated at the outset which is convenient to operate, can be produced with a relatively low outlay and/or, when required, in a more compact way and, for example, in a form such that it can be integrated easily into sanitary shower devices and other sanitary water discharge faucets and which can be switched over in a functionally reliable manner. It is a further object of the invention to provide a sanitary shower device equipped with such fluid switch-over device.

The invention achieves these and other objects by providing a fluid switch-over device comprising at least one fluid inlet and at least two fluid outlets, a movable switch-over body for controlling fluid connections of the at least two fluid outlets to the at least one fluid inlet, wherein the switch-over body is switchable between at least three different operating positions, and an actuation device, configured for sequential and bidirectional switching-over actuation of the switch-over body both in a forward switch-over direction and in a backward switch-over direction inverse to the forward switch-over direction, wherein the actuation device comprises a first actuation unit for sequential switching-over actuation of the switch-over body in the forward switch-over direction and a second actuation unit for sequential switching-over actuation of the switch-over body in the backward switch-over direction, and wherein the two actuation units comprise operating elements that are user-operable independently of each other.

In the fluid switch-over device according to the invention, the actuation device has respective actuation units for switching over the switch-over body in the forward switch-over direction and in the backward switch-over direction. Here, the two actuation units include operating elements that are user-operable independently of each other.

The user can therefore switch the fluid switch-over device selectively and conveniently in a desired manner in the forward switch-over direction or the backward switch-over direction by selecting which of the two operating elements is operated. Moreover, by virtue of the bidirectional switch-over capability, it is possible, by means of just one switch-over operation, for example, to switch back from an instantaneous operating position of the switch-over body into the operating position of said body set immediately before, irrespective of how many different operating positions are provided for the switch-over body. The fluid switch-over device configured in this way and having this actuation device can be constructed in a compact way and, for example, can be readily integrated into sanitary water discharge faucets, such as sanitary shower devices.

As a further development of the invention, the two operating elements are operating elements responding to operating pressure, e.g. in the form of pushbutton elements, sliding switches or touchpad elements. Pressure-sensitive operating elements of this kind can be arranged directly adjacent to each other or with a small spacing next to each other, for example, thus enabling them to be operated comfortably by the user, e.g. with one finger.

As a further development of the invention, the two actuation units each include a linear force transmission element, e.g. a rod element, wire element or the like that transmits a pushing force and/or a pulling force. The two force transmission elements are coupled, on the one hand, to a respective one of the operating elements and, on the other hand, to the switch-over body, being coupled directly or indirectly, i.e. with the interposition of one or more coupling elements, and have opposite directions of action on the switch-over body, i.e. one force transmission element is used to actuate the switch-over body in the forward switch-over direction and the other force transmission element is used to actuate the switch-over body in the backward switch-over direction.

As a further development of the invention, the switch-over body is rotatably movable about a rotation axis and the directions of action of the two force transmission elements on the switch-over body are opposed directions of rotation. In this case, the various operating positions of the switch-over body correspond to different rotation angle positions thereof, between which it can be rotated. An embodiment of this kind favours a compact construction of the fluid change-over device. As an option, the change-over body can additionally be axially movable parallel to the rotation axis. In this case, the actuation of the switch-over body includes a combined axial and rotary movement thereof. This can be advantageous for applications in which the switch-over body rests against a fixed valve seat of the fluid switch-over device in the operating position. This is because, in this case, the switch-over body can then initially be raised axially from the valve seat before it is rotated into its next operating position. This can have a wear-reducing effect, and the torque to be applied for the rotation of the switch-over body can be kept low.

As a further development of the invention, the switch-over body has a sprocket arrangement, with which the two force transmission elements cooperate, more specifically on opposite sides in relation to a central longitudinal plane including the rotation axis of the switch-over body, this being advantageous for the intended opposed directions of action of the force transmission elements on the switch-over body. Each of the two force transmission elements is in engagement with the sprocket arrangement during a forward movement and thereby rotates the switch-over body. In contrast, the force transmission elements are not in engagement with the sprocket arrangement during a backward movement opposite to the forward movement, thus allowing the force transmission elements to move back into a rearward initial position without thereby rotating the switch-over body again or rotating it back. This represents an advantageous mechanical coupling solution for the desired switch-over actuation of the switch-over body, wherein, in this case, a translational movement, i.e. a linear movement, of the force transmission elements is converted into a rotary movement of the switch-over body.

As a further development of the invention, the sprocket arrangement comprises a common sprocket for both force transmission elements or a dedicated sprocket for each of the two force transmission elements. In the latter case, the two sprockets are arranged on the switch-over body in a manner offset axially, i.e. parallel to the rotation axis of the switch-over body. Depending on requirements and the system environment, each of the two mentioned alternative embodiments of the sprocket arrangement can advantageously be selected for a functionally advantageous and compact construction of the fluid switch-over device and for installation of the fluid switch-over device, e.g. in a sanitary water discharge faucet.

As a further development of the invention, the two sprockets of the sprocket arrangement have opposed saw-tooth-type toothed profiles. It is thereby possible to assist the functionality of the force transmission elements in a structurally simple manner, according to which said elements rotate the switch-over body only in the forward movement thereof but not in the backward movement thereof.

As a development of the invention, the actuation device comprises at least one elastic return element exerting an elastic return force on the first and/or the second force transmission element towards an initial position. In advantageous embodiments, the initial position is the rearward position of the respective force transmission element, from which it can be moved forwards by the user by operation of the associated operating element in order to actuate the switch-over body for a switch-over. In this case, the elastic return element is capable of automatically moving back the force transmission element that has been moved forwards into the rearward initial position thereof without the need for action by the user.

As a further development of the invention, the actuation device comprises a sliding guide mechanism with cooperating sliding guide elements on the switch-over body, on the one hand, and on a part of the fluid switch-over device that is stationary in relation to the switch-over body, on the other hand, wherein the sliding guide elements are movable relative to each other between stable positions, which define the operating positions of the switch-over body. This enables the sliding guide to assist the actuation units in moving the switch-over body into the respective next desired operating position and to hold it securely therein. For example, the sliding guide and the actuation units can be matched to each other in such a way that the respective actuating unit moves the switch-over body out of the previous operating position thereof only as far as an unstable intermediate position of the sliding guide, after which the sliding guide moves from there into the next stable position thereof and, in the process, takes along the switch-over body into the associated next operating position thereof. This allows the user short switching paths since the actuation unit has only to be actuated as far as the unstable intermediate position of the sliding guide.

As a further development of the invention, the actuation device is configured for generating a switch-over sound for signalling actuation upon actuation of the respective operating element and corresponding change of the operating position of the switch-over body. This makes it easy for the user to perceive that a switch has been made to a different fluid outlet. The switch-over sound can be a clicking sound, for example, or some other sound characteristic of the switch-over process.

The invention further achieves the above-mentioned and other objects by providing a sanitary shower device which includes a shower housing having a shower inlet and a shower head including at least two groups of shower jet output openings arranged fluidically in parallel, and the fluid switch-over device according to the invention, which in this case is used for controlling fluid supply from the shower inlet to the fluidically parallel groups of shower jet output openings. This fluid switch-over device at least comprises at least one fluid inlet and at least two fluid outlets, a movable switch-over body for controlling fluid connections of the at least two fluid outlets to the at least one fluid inlet, wherein the switch-over body is switchable between at least three different operating positions, and an actuation device, configured for sequential and bidirectional switching-over actuation of the switch-over body both in a forward switch-over direction and in a backward switch-over direction inverse to the forward switch-over direction, wherein the actuation device comprises a first actuation unit for sequential switching-over actuation of the switch-over body in the forward switch-over direction and a second actuation unit for sequential switching-over actuation of the switch-over body in the backward switch-over direction, and wherein the two actuation units comprise operating elements that are user-operable independently of each other. It is thereby possible for the user to comfortably select or switch between different shower jet types, for example, in accordance with the various groups of shower jet output openings.

As a further development of the invention, the switch-over body is disposed within the shower head of the sanitary shower device, and the operating elements of the switch-over device, that are user-operable independently of each other, are disposed mutually adjacent on the shower housing, e.g. directly next to each other or with a certain spacing relative to each other in such a way that they can easily be operated with one finger by the user. This is particularly advantageous for hand-held shower devices, the housing of which the user can grip with one hand. The operating elements can then be operated very conveniently with one finger of this hand. This represents a very user-friendly, compact and functionally advantageous integration of the fluid switch-over device according to the invention into a sanitary shower device, e.g. a hand-held shower device for a shower unit.

Additional features and advantages of the present invention will become apparent to those skilled in the art upon consideration of the following detailed descriptions of the illustrative embodiment best exemplifying the best mode of carrying out the invention as presently perceived.

BRIEF DESCRIPTION OF THE DRAWINGS

Advantageous embodiments of the invention are illustrated in the drawings and are described below. In the drawings.

DETAILED DESCRIPTION OF THE DRAWINGS

Figure 1:
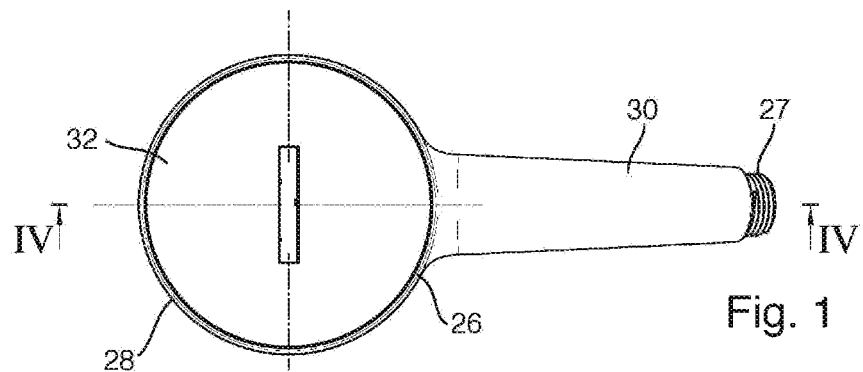
FIG. 1 shows a plan view from above of a sanitary hand-held shower device with a fluid switch-over device.

The embodiments of the invention described herein are not intended to be exhaustive or to limit the invention to precise forms disclosed. Rather, the embodiments selected for description have been chosen to enable one skilled in the art to practice the invention.

The fluid switch-over device illustrated in FIGS. 6 to 11 includes at least one fluid inlet 1, at least two fluid outlets 2, a movable switch-over body 3 and an actuation device 4. The switch-over body 3 can be switched over between at least three different operating positions in order to control fluid connections of the at least two fluid outlets 2 to the at least one fluid inlet 1. The actuation device 4 is designed for sequential and bidirectional switch-over actuation of the switch-over body 3 both in a forward switch-over direction and in a backward switch-over direction, which is inverse to the forward switch-over direction.

The actuation device 4 includes a first actuation unit 5 for the sequential switch-over actuation of the switch-over body 3 in the forward switch-over direction and a second actuation unit 6 for the sequential switch-over actuation of the switch-over body 3 in the backward switch-over direction. The first actuation unit 5 has a first operating element 7, and the second actuation unit 6 has a second operating element 8, wherein the two operating elements 7, 8 are user-operable independently of each other.

In the illustrative embodiment shown in FIGS. 6 to 11, the two operating elements 7, 8 are implemented as operating elements 7a, 8a that respond to operating pressure, e.g. as corresponding pushbuttons. The pressure-sensitive operating elements 7a, 8a can be pivotable about a respective rotation axis $D_B$, as shown, for example, wherein the two rotation axes $D_B$ thereof can coincide or can be different from each other, depending on requirements and system design.

Furthermore, the first actuation unit 5 comprises a first linear force transmission element 9, and the second actuation unit 6 comprises a second linear force transmission element 10. The two force transmission elements 9, 10 are each coupled to a respective one of the two operating elements 7, 8, on the one hand, and to the switch-over body 3, on the other hand, and have opposed directions of action on the switch-over body 3. In the example shown, the two linear force transmission elements 9, 10 are each formed by an elongate element that can be subjected at least to a pushing load, such as a corresponding rod, bar, wire or tube element, wherein the respective elongate element is guided in such a way as to be movable transversely backwards and forwards in an associated sleeve guide 11, 12. At its operating-element end, the respective elongate element is provided with a pedal part 13, 14, by means of which it cooperates with a push cam 15, 16, which is formed on the respective pressure-sensitive operating element 7a, 8a. As an alternative, some other conventional pushing-force coupling between the respective pressure-sensitive operating element 7a, 8a and the associated linear force transmission element 9, 10 can be provided.

In the illustrative embodiment shown in FIGS. 6 to 11, the switch-over body 3 is rotatable about a rotation axis $D_U$, wherein the rotation axis $D_U$ can coincide with a longitudinal axis $L_U$ of the switch-over body 3. The directions of action of the two linear force transmission elements 9, 10 are consequently opposite directions of rotation, namely a forward direction of rotation $D_V$, e.g. clockwise, and a backward direction of rotation $D_R=-D_V$ anticlockwise. A pressure actuation of the first operating element 7a brings about a transversal advance of the first force transmission element 9 in the pushing direction S, as a result of which the switch-over body 3 is rotated in the forward direction of rotation $D_V$. A pressure actuation of the second operating element 8a brings about a transversal advance of the second force transmission element 10 in the pushing direction S, as a result of which the switch-over body 3 is rotated in the backward direction of rotation $D_R$.

In order to convert the linear movement of the force transmission elements 9, 10 into the rotary movement of the switch-over body 3, the switch-over body 3 has a sprocket arrangement 17, with which the two force transmission elements 9, 10 cooperate, namely on opposite sides in relation to a longitudinal centre plane $E_U$ of the switch-over body 3, wherein the longitudinal centre plane $E_U$ of the switch-over body 3 contains the rotation axis $D_U$ thereof and is parallel to the pushing direction S of the linear force transmission elements 9, 10. Each of the two linear force transmission elements 9, 10 is in engagement with the sprocket arrangement 17 during the forward movement in the pushing direction S and rotates the switch-over body 3 correspondingly in the forward and backward direction of rotation $D_V$, $D_R$. In contrast, the force transmission elements 9, 10 are out of engagement with the sprocket arrangement 17 during a return movement counter to the forward movement, i.e. in a backward direction R=−S counter to the pushing direction S.

In the illustrative embodiment shown in FIGS. 6 to 11, the sprocket arrangement 17 has a first sprocket 17a for the first force transmission element 9 and a second sprocket 17b, arranged axially offset relative to the first sprocket 17a, for the second force transmission element 10. In the example shown, the two sprockets 17a, 17b are in a region of a cylindrical main body part of the switch-over body 3 which is at the top in FIG. 7. It can be advantageous functionally if the first and the second sprocket 17a, 17b each have a sawtooth-type toothed profile and, as shown, more specifically opposed sawtooth-type toothed profiles. The force transmission elements 9, 10 come into engagement with a head part 9a, 10a with the associated sawtooth-type toothed profile of the first and second sprocket 17a, 17b, respectively, during the forward movement thereof in direction S and rotate the switch-over body 3 accordingly, wherein the head part 9a, 9b has a shape suitable for this purpose, e.g. a tooth-type shape.

The actuation device 4 can advantageously include at least one elastic return element, as in the illustrative embodiment in FIGS. 6 to 11, in order to exert an elastic return force on the force transmission elements 9, 10 into an initial position. In the example shown, a first elastic return element 18a and a second elastic return element 18b are provided for this purpose, e.g. in each case in the form of a helical spring, wherein the first elastic return element 18a exerts the elastic return force in the backward direction R counter to the pushing direction S on the first force transmission element 9 and, in the same way, the second elastic return element 18b exerts the elastic return force on the second force transmission element 10 in the backward direction R. In this case, the rest position shown in FIGS. 6 and 8, in which there is no activation of the actuation device 4 by the user, represents the initial position of the force transmission elements 9, 10, in which these elements are in their retracted position, in which they have not been pushed forwards. The return elements 18a, 18b are each supported, on the one hand, on a supporting component 19a, 19b, which remains stationary relative to the switch-over body 3 and the force transmission elements 9, 10, and, on the other hand, on a supporting surface of the head parts 9a, 10a of the force transmission elements 9, 10.

The actuation device 4 furthermore comprises a sliding guide 20 with cooperating sliding guide elements 20a, 20b on the switch-over body 3, on the one hand, and on a part 21 of the fluid switch-over device which is stationary relative to the switch-over body 3, on the other hand. In this case, the sliding guide elements 20a, 20b are movable relative to each other between stable positions, which define the operating positions of the switch-over body 3.

Figure 7:
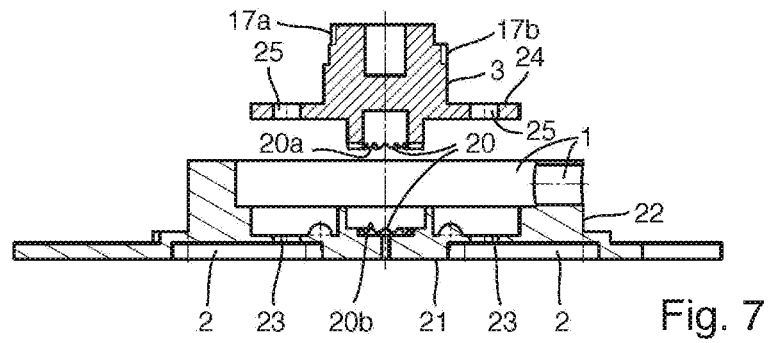
FIG. 7 shows an exploded longitudinal section through the switch-over body and through a distributor element of the fluid switch-over device in FIG. 6.
Figure 8:
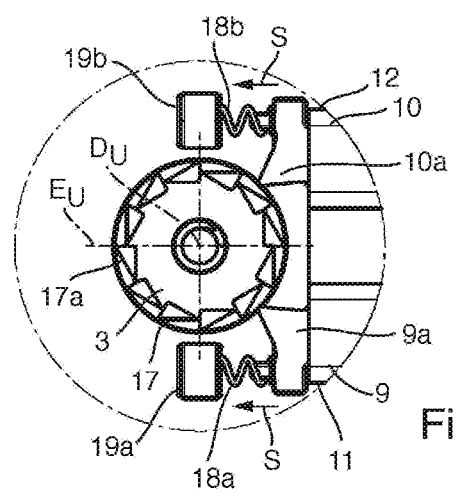
FIG. 8 shows a detail view of a region VIII of FIG. 3 showing a plan view of the switch-over body and an adjoining part of the actuation device.

In the illustrative embodiment shown in FIGS. 6 to 11, the two cooperating sliding guide elements 20a, 20b are each formed by a toothed end ring, of which one is formed on an end of the cylindrical main body part of the switch-over body 3 which is at the bottom in FIG. 7 and the other is formed on a side of a distributor body 22 which is at the top in FIG. 7, said body forming the corresponding part 21, stationary with respect to the switch-over body 3, of the fluid switch-over device in this example. On the side of the distributor body 22 at the top in FIG. 7, said body has the at least one fluid inlet 1 and, on the side of the distributor body 22 at the bottom in FIG. 7, said body has the at least two fluid outlets 2 of the fluid switch-over device. At least one through opening 23 in the distributor body 22 leads in each case from at least one fluid inlet 1 to the respective fluid outlet 2. In this illustrative configuration, the switch-over body 3 in FIG. 7 can be inserted from above into a corresponding receptacle in the distributor body 22 and, in a control ring region 24 projecting radially from the cylindrical main body part, has control openings 25 which, depending on the rotational position of the switch-over body 3, overlap completely or partially with one or more of the through openings 23 or completely shut off said openings from the at least one fluid inlet 1. Accordingly, the switch-over body 3 controls the fluid connections of the fluid outlets 2 to the fluid inlet or inlets 1 depending on its rotational position.

Figure 9:
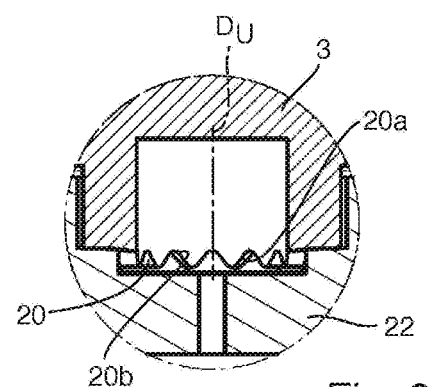
FIG. 9 shows a detail view of a region IX of FIG. 4 showing a longitudinal section from the region of a sliding guide of the actuation device.
Figure 11:
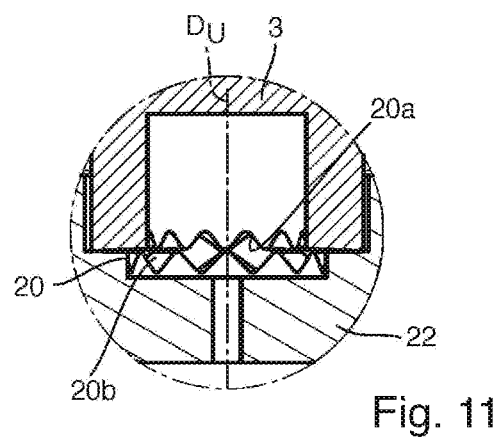
FIG. 11 shows the view in FIG. 9 in the intermediate switch-over position of FIG. 10.

With its sliding guide elements 20a, 20b, the sliding guide 20 is configured in such a way that the mutually opposite toothed end rings can engage in each other in a corresponding rotational position of the switch-over body 3 relative to the distributor body 22, as shown in FIG. 9, as a result of which a stable position of the sliding guide elements 20a, 20b is in each case formed, said position correspondingly defining a stable position, i.e. an operating position, of the switch-over body 3. The sliding guide elements 20a, 20b can be moved out of this respective stable position by rotation of the switch-over body 3 relative to the distributor body 22, wherein the tooth flanks of the toothed end rings slide along each other until the toothed tips of the toothed end rings lie opposite each other, as shown in FIG. 11, wherein the switch-over body 3, in addition to its rotary movement, performs a corresponding axial lift-off movement relative to the distributor body 22 equal to the height or depth of the toothed end rings. This axial lifting off takes place against the action of an axial bias element (not shown), which biases the switch-over body axially in the direction of the distributor body. As soon as the sliding guide elements 20a, 20b have exceeded this unstable position shown in FIG. 11 through slight onward rotation of the switch-over body 3, the teeth of the toothed end rings slide into the respective next depression of the opposite toothed end ring, as a result of which the switch-over body 3 is correspondingly rotated further into the next operating position thereof, which is associated with this next stable position of the sliding guide elements 20a, 20b, wherein the switch-over body 3 additionally once again moves axially in a corresponding manner.

The following advantageous course of a respective switch-over operation of the fluid switch-over device is thereby obtained with the actuation device 4 described. The user actuates either the first actuation unit 5 or the second actuation unit 6 by corresponding pressure on the operating element 7a, 8a, depending on the direction in which the switch-over body 3 is to be switched over.

Figure 10:
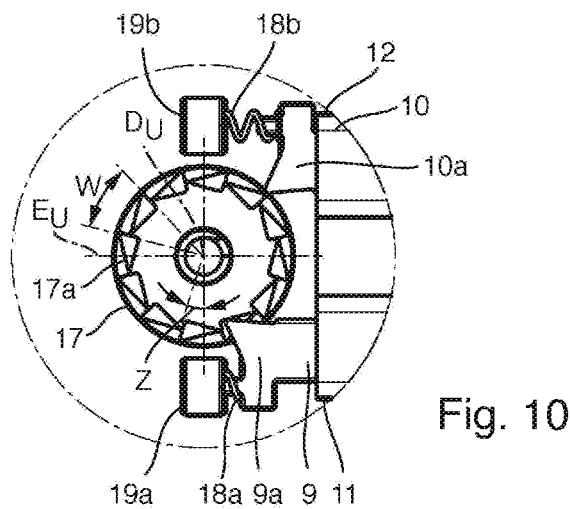
FIG. 10 shows the view of FIG. 8 in an intermediate switch-over position of the fluid switch-over device.

If the first operating element 7a is operated, said element pushes the force transmission element 9 in pushing direction S, as a result of which the head part 9a of said element moves forwards into engagement with the associated sprocket 17a, causing rotation of the switch-over body 3 in the forward direction of rotation $D_V$. The advancing movement of the first operating element 9 continues until the two cooperating sliding guide elements 20a, 20b of the sliding guide 20 have reached and slightly exceeded the unstable position thereof shown in FIG. 11. The associated advanced position of the first force transmission element 9 and the associated rotated intermediate position of the switch-over body 3 are shown in FIG. 10. As compared with the initial position in FIG. 8, the switch-over body 3 is rotated by an intermediate rotation angle z, which corresponds approximately to half the tooth pitch of the toothed end rings of the sliding guide 20. The advance of the first force transmission element 9 takes place against the return force of the first elastic return element 18a.

As soon as the user then releases the operating element 7a, the elastic return element 18a pushes the force transmission element 9 back into its rearward initial position, wherein the head part 9a thereof moves back out of engagement with the associated sprocket 17a. This can be assisted by the sawtooth-type toothed profile and/or by suitable configuration of that portion of the head part 9a which comes into engagement therewith. Furthermore, the switch-over body 3 is rotated further under the action of the axial bias element (not shown) and of the sliding guide 20 until the toothed end rings have adopted their next meshing position in the direction of rotation, i.e. the next stable position of the cooperating sliding guide elements 20a, 20b. The switch-over body 3 has then rotated overall by approximately twice the intermediate rotation angle z from the previous operating position into the next operating position of the body. This total rotation angle between two respective adjacent operating positions of the switch-over body 3 can simultaneously correspond approximately to one tooth pitch w of the first sprocket 17a.

In a similar manner, when the user operates the second operating element 8a, the second force transmission element 10 is pushed forwards in pushing direction S, as a result of which it enters into engagement with the associated second sprocket 17b and rotates the switch-over body 3 back in the backward direction of rotation $D_R$ as far as an intermediate position similar to that in FIGS. 10 and 11. After the user has released the operating element 8a, the second elastic return element 18b, which has been tensioned by the advancing movement of the second force transmission element 10, then pushes the second force transmission element 10 back again, with the result that it moves out of engagement with the associated sprocket 17b. Through the action of its axial bias element and the sliding guide 20, the switch-over body 3 rotates into the next operating position in the backward direction of rotation $D_R$ once the sliding guide 20 has reached and slightly exceeded its unstable intermediate position similar to that in FIG. 11 by virtue of the advancing movement of the second linear force transmission element 10.

Consequently, the fluid switch-over device described allows sequential and bidirectional switching of the switch-over body 3 both in a forward switch-over direction and a backward switch-over direction inverse relative to the latter, wherein these are directions of rotation in the example shown but, in alternative embodiments, can also be transversal switch-over movements, for example. In either case, this switch-over functionality has the advantage that only a relatively small number of switch-over operations is necessary to switch the switch-over body between any two operating positions, even when the switch-over body has a relatively large number of different operating positions between which it can be switched. Thus, for example, in the case of six possible operating positions, each new operating position can be reached from each instantaneous operating position with at most three individual switch-over operations, whereas, in the case of a conventional, unidirectional progressive switching function, for example, up to five individual switch-over operations may be required. If required, a sound characteristic of the switch-over process, e.g. a clicking sound, can be produced by appropriate conventional means, indicating acoustically to the user that the switch-over operation has been successfully carried out.

The fluid switch-over device illustrated in FIGS. 6 to 11 is suitable, for example, for installation in a sanitary water discharge faucet, such as a sanitary shower device. In this connection, FIGS. 1 to 5 show, by way of example, a sanitary shower device in the form of a hand-held shower device with a built-in fluid switch-over device of the type shown in FIGS. 6 to 11. In the example shown, the hand-held shower device comprises a shower housing 26 having a shower inlet 27 and a shower head 28, which has at least two fluidically parallel groups of shower jet output openings 29.

On the inlet side, the shower housing 26 includes a handle part 30, which can be gripped by the user to operate the hand-held shower device and into which an inlet tube body 31 is inserted, which forms the shower inlet 27 on the inlet side and opens into the fluid inlet 1 of the fluid switch-over device in the shower head 28 on the outlet side. The handle part 30 laterally adjoins the cylindrical shower head 28, which has a cover 32 on the top side and, on the bottom side, ends with a jet disc 33 on the shower-jet outlet side. In the transitional region between the handle part 30 and the shower head 28, the pushbutton operating elements 7a, 8a are mounted on the underside of the shower housing 26 in such a way as to be pivotable about their pivoting axis $D_B$, thus enabling them to be operated easily by the user, e.g. by means of the thumb of the user's hand gripping the handle part 30. As can be seen from FIG. 2, the two operating elements 7a, 8a are preferably arranged directly adjacent to each other here.

Figure 2:
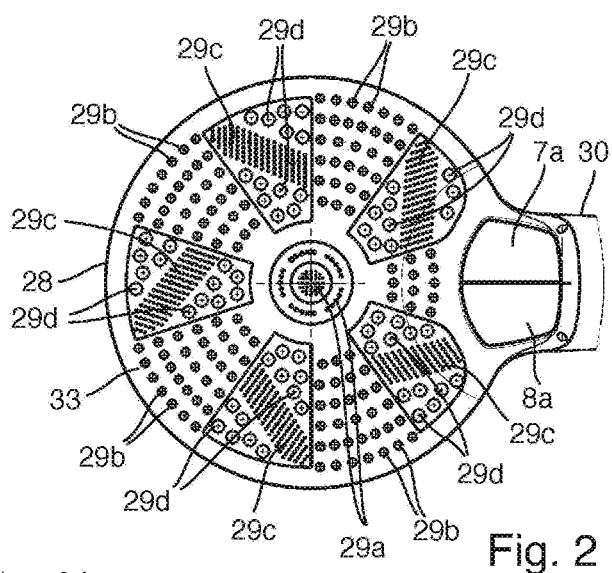
FIG. 2 shows a plan view from below of a shower head region of the shower device in FIG. 1.

As can likewise be seen especially from FIG. 2, the at least two fluidically parallel groups of shower jet output openings 29 in this example include four fluidically parallel groups of shower jet output openings, which are arranged in a manner distributed over the bottom-side jet disc 33 of the shower head 28, namely a first group of central shower jet output openings 29a, a second group of peripheral shower jet output openings 29b, which are arranged in a plurality of subgroups spaced apart in the circumferential direction, a third group of peripheral shower jet output openings 29c, which are arranged in oblique strips in the interspaces between the subgroups of the second group of shower jet output openings 29b, and a fourth group of shower jet output openings 29d, which are arranged radially to the inside and to the outside of the oblique strips of the third group of shower jet output openings 29c. Each of these four fluidically parallel groups of shower jet output openings 29a to 29d makes available a corresponding unique shower jet type for the hand-held shower device. Depending on requirements and the application, hybrid forms are also possible here, in which not just one but several of the four groups of shower jet output openings 29a to 29d are simultaneously active as shower outlet openings, i.e. contribute with their respective shower jet to the overall shower jet of the hand-held shower device.

Figure 3:
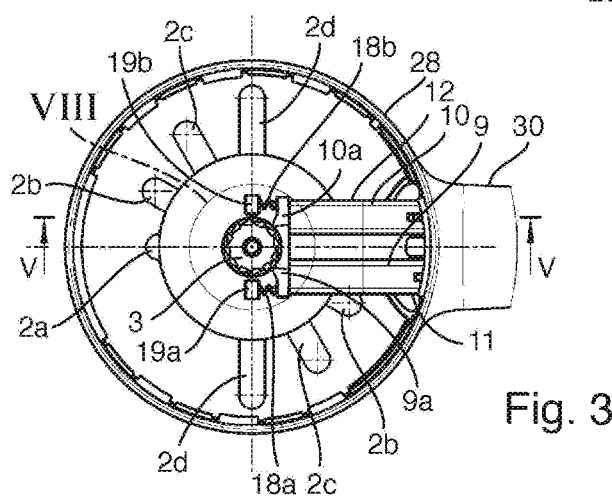
FIG. 3 shows a plan view from above of the shower head region with the cover removed.
Figure 4:
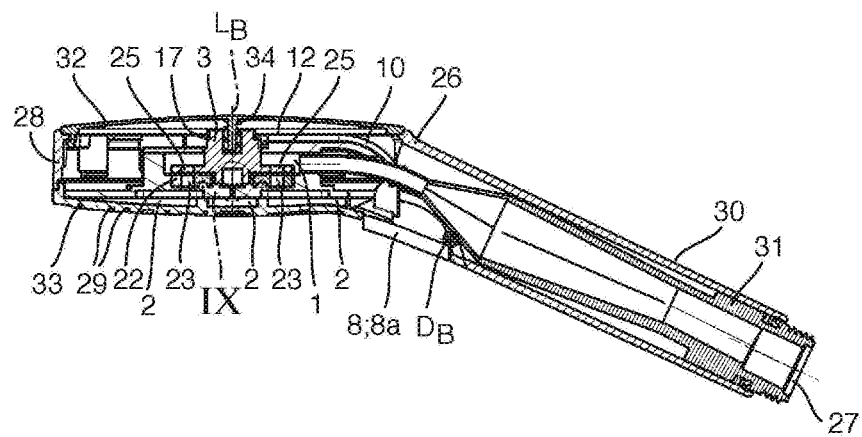
FIG. 4 shows a longitudinal section along a line IV-IV in FIG. 1.
Figure 5:
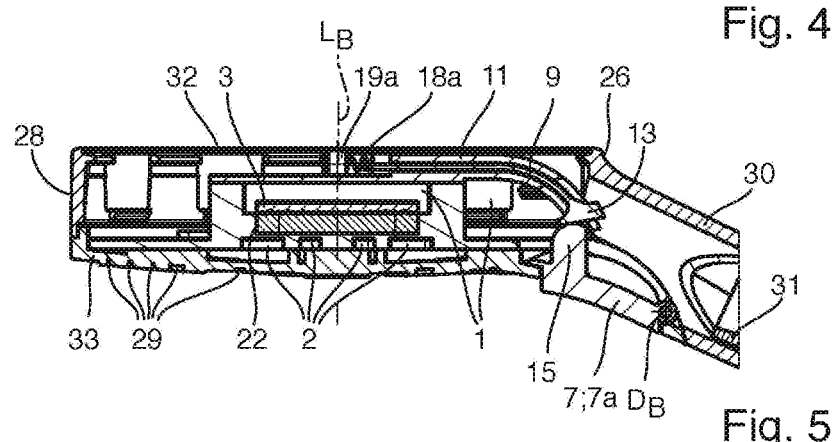
FIG. 5 shows a longitudinal section along a line V-V in FIG. 3.
Figure 6:
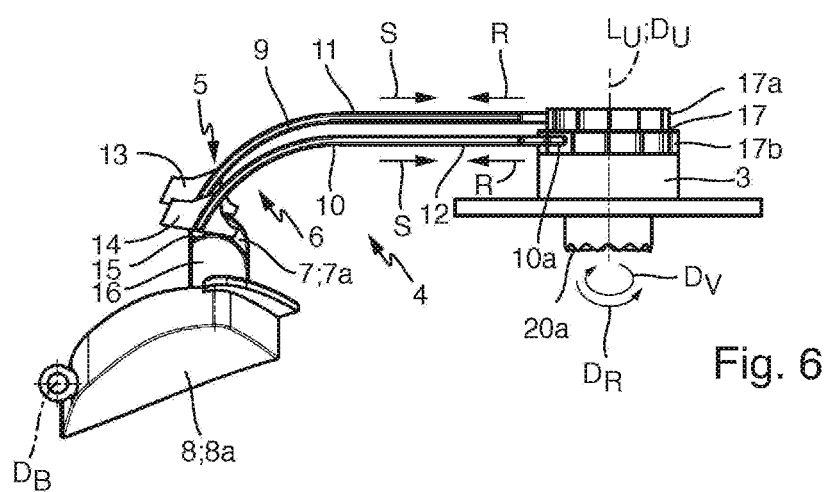
FIG. 6 shows a side view of a switch-over body and of an actuation device of a fluid switch-over device that can be used for the sanitary shower device in FIGS. 1 to 5.

Matched to the four fluidically parallel groups of shower jet output openings 29a to 29d, the at least two fluid outlets 2 of the fluid switch-over device integrated into the hand-held shower device are formed by an outlet configuration with four fluidically parallel fluid outlet channels 2a, 2b, 2c, 2d, of the kind which can be seen especially from FIG. 3.

This fluid outlet configuration is provided by suitable design of the distributor body 22, optionally in conjunction with one or more components installed in the shower head 28. On the inlet side, the fluid outlet channels 2a to 2d each end in one or more of the associated through openings 23 provided in the distributor body 22, which are completely shut off individually by the switch-over body 3, depending on the operating position thereof, or are completely or partially opened via the control openings 25 thereof, with the result that the fluid connection from the fluid inlet 1 and hence from the shower inlet 27 to the respective group of shower jet output openings 29a to 29d is accordingly shut off or completely or partially opened or enabled. By selective actuation of one or the other of the two operating elements 7a, 8a or pushbuttons, the user can change these fluid connections in a controlled manner and, in the process, can switch between the various possible shower jet types of the hand-held shower device, namely sequentially and bidirectionally both in the forward and in the backward switch-over direction. Since the two operating elements 7a, 8a can be operated independently of one another and are arranged next to one another, a convenient, intuitive and functionally advantageous operating functionality is made available to the user.

As shown, the fluid switch-over device can be integrated very compactly into the sanitary shower device, in the case of FIGS. 1 to 5 into the compactly constructed shower head of the hand-held shower device. In the example shown, the switch-over body 3 is positioned with the rotation axis $D_U$ or central longitudinal axis $L_U$ parallel to a central longitudinal axis $L_B$ of the shower head and preferably identical thereto. A helical compression spring 34, which is supported, on the one hand, against the switch-over body 3 and, on the other hand, against the cover 32 on the inside, acts as a bias element which elastically biases the switch-over body 3 axially in the direction of the distributor body 22, wherein said spring is guided by a peg which projects from the inner side of the cover 32 and engages in a top-side recess in the switch-over body 3, in which the helical compression spring 34 is seated. The supporting components 19a, 19b and the sleeve guides 11, 12 are formed by corresponding components of the shower head 28.

It is self-evident that both the hand-held shower device in FIGS. 1 to 5 and the fluid switch-over device in FIGS. 6 to 11 can be used per se in a form modified relative to the example shown. For example, the fluid switch-over device can alternatively be integrated into a kitchen spray unit of a kitchen sink or into a mixer fitting for a washbasin, a shower or a bathtub unit or into a head or side shower of a shower unit. Furthermore, the fluid switch-over device can be configured in such a way, depending on requirements and the application, that the switch-over body thereof can be switched between any of three or more different operating positions, for which purpose it is sufficient, for example, to modify the sliding guide 20 and/or the sprocket arrangement 17 accordingly.

Figure 12:
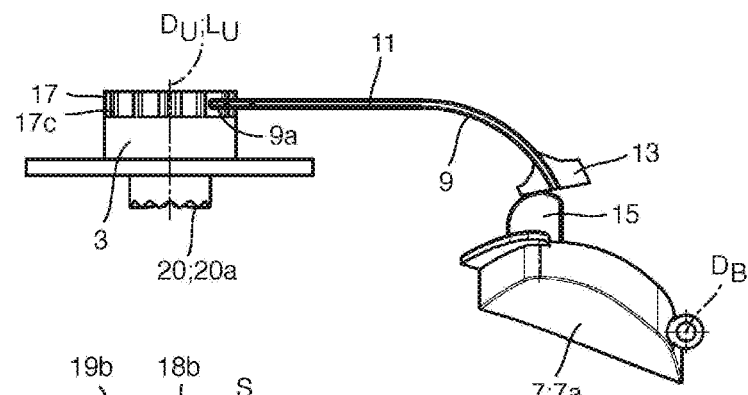
FIG. 12 shows a view corresponding to FIG. 6 relating to a variant of the fluid switch-over device with modified coupling of the actuation device and the switch-over body.
Figure 13:
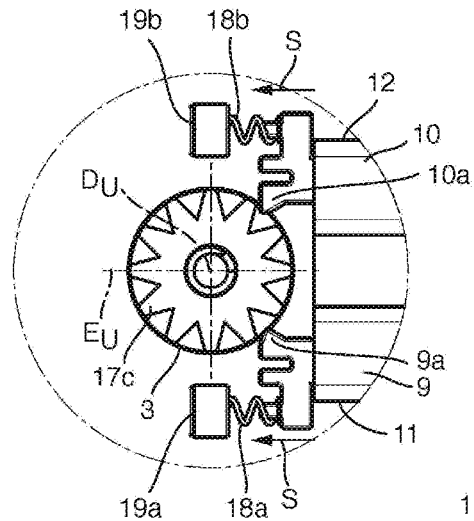
FIG. 13 shows a view corresponding to FIG. 8 relating to the fluid switch-over device in FIG. 12.
Figure 14:
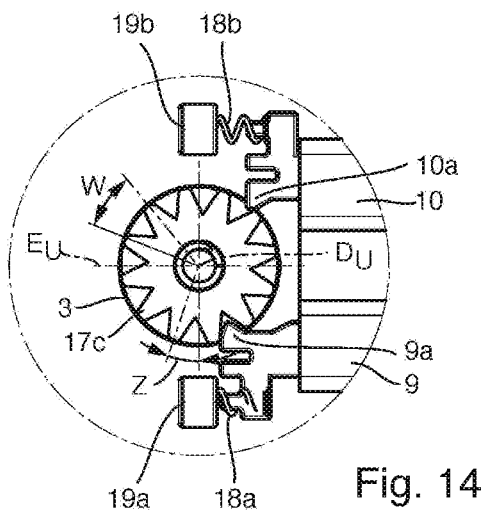
FIG. 14 shows a view corresponding to FIG. 10 relating to the fluid switch-over device in FIG. 12.

FIGS. 12 to 14 show a variant of the fluid switch-over device in FIGS. 6 to 11 with a modified sprocket arrangement 17. In this illustrative embodiment, the sprocket arrangement 17 includes a common sprocket 17c for both linear force transmission elements 9, 10, the head parts 9a, 10a of which in this case thus extend at the same axial height and both in turn cooperate with the common sprocket 17c on opposite sides of the longitudinal centre plane $E_U$ of the switch-over body 3, said plane containing the rotation axis $D_U$ and being parallel to the pushing direction S. Instead of the sawtooth-type toothed profiles of the sprockets 17a, 17b in the illustrative embodiment in FIGS. 6 to 11, the common sprocket 17c in the illustrative embodiment in FIGS. 12 to 14 has a toothed profile with tooth flanks symmetrical with the central longitudinal axis of said profile. Since the head parts 9a, 10a of the two linear force transmission elements 9, 10 are each out of engagement with the sprocket 17c when they are in their retracted initial position in accordance with FIG. 13, the rotary movement of the switch-over body 3, when brought about by the advancing movement either of one or the other force transmission element 9, 10, is not obstructed by the respective other force transmission element 9, 10, which remains in the initial position.

If required, the linear force transmission elements 9, 10 can be embodied in such a way as to be flexible or yielding in the transverse direction at the head part 9a, 10a, i.e. perpendicularly to the pushing direction S, both in the illustrative embodiment in FIGS. 6 to 11 and in the illustrative embodiment in FIGS. 12 to 14, allowing them to give way transversely outwards when and to the extent that this is required for their return movement from the position of maximum advance to the position of maximum retraction and/or to give way during the movement of the switch-over body 3 brought about by the respective other force transmission element 9, 10.

The actuation or switch-over operations take place in the same way for the variant embodiment in FIGS. 12 to 14 as for the variant embodiment in FIGS. 6 to 11, to the above description of which therefore reference can be made. Once again, the switch-over body 3 is rotated by means of one or the other of the two actuation units 5, 6 or the force transmission elements 9, 10 thereof until the cooperating sliding guide elements 20a, 20b of the sliding guide 20 reach and go slightly beyond their unstable intermediate position, after which the sliding guide 20 continues to rotate the switch-over body 3 completely into the next desired operating position. FIG. 13 shows the fluid switch-over device with the force transmission elements 9, 10 in the initial position thereof corresponding to FIG. 8, while FIG. 14 shows the fluid switch-over device in the intermediate position thereof with advanced force transmission element 9 in accordance with FIG. 10. Once again, the tooth pitch w of the sprocket arrangement 17 corresponds approximately to twice the intermediate rotation angle z of the switch-over body 3 for rotation from the instantaneous operating position into the unstable position of the sliding guide 20 in the centre between the desired next and the previous operating position of the switch-over body 3. This tooth pitch w once again corresponds substantially to the angular interval between two adjacent stable positions of the sliding guide 20.

As the illustrative embodiments shown and explained above make clear, the invention makes available an advantageous fluid switch-over device and an advantageous sanitary shower device equipped therewith, wherein the fluid switch-over device is distinguished, in particular, by the fact that it can be implemented in a relatively compact way and enables sequential switch-over actuation of the switch-over body bidirectionally either in the forward or backward switch-over direction using two independently user-operable operating elements and associated actuation units for the switch-over body.

Although the invention has been described in detail with reference to certain preferred embodiments, variations and modifications exist within the spirit and scope of the invention as described and defined in the following claims.

The invention claimed is:

1. A fluid switch-over device, comprising:
at least one fluid inlet and at least two fluid outlets;
a movable switch-over body for controlling fluid connections of the at least two fluid outlets to the at least one fluid inlet, wherein the switch-over body is switchable between at least three different operating positions; and
an actuation device, configured for sequential and bidirectional switching-over actuation of the switch-over body both in a forward switch-over direction and in a backward switch-over direction inverse to the forward switch-over direction;
wherein the actuation device comprises a first actuation unit for sequential switching-over actuation of the switch-over body unidirectionally in the forward switch-over direction and a second actuation unit for sequential switching-over actuation of the switch-over body unidirectionally in the backward switch-over direction; and
wherein the first actuation unit and the second actuation unit include operating elements that are user-operable independently of each other so that switching-over actuation of the switch-over body in the forward switch-over direction is accomplished by user-operating the operating element included in the first actuation unit only, while not by user-operating the operating element included in the second actuation unit, and switching-over actuation of the switch-over body in the backward switch-over direction is accomplished by user-operating the operating element included in the second actuation unit only, while not by user-operating the operating element included in the first actuation unit.

2. The fluid switch-over device according to claim 1, wherein the operating elements of the first actuation unit and the second actuation unit are operating elements responding to operating pressure.

3. The fluid switch-over device according to claim 1, wherein the first actuation unit includes a first linear force transmission element and the second actuation unit includes a second linear force transmission element, wherein the first linear force transmission element and the second linear force transmission element are coupled to a respective one of the operating elements of the first actuation unit and the second actuation unit, and to the switch-over body, and have opposite directions of action on the switch-over body.

4. The fluid switch-over device according to claim 3, wherein the switch-over body is rotatably movable about a rotation axis and the directions of action of the first linear force transmission element and the second linear force transmission element on the switch-over body are opposed directions of rotation.

5. The fluid switch-over device according to claim 4, wherein the switch-over body comprises a sprocket arrangement, and the first linear force transmission element and the second linear force transmission element cooperate with the sprocket arrangement on opposite sides in relation to a central longitudinal plane including the rotation axis of the switch-over body, wherein each of the first linear force transmission element and the second linear force transmission element is in engagement with the sprocket arrangement during a forward movement of the switch-over body for rotating and is in disengagement during a backward movement opposite to the forward movement.

6. The fluid switch-over device according to claim 5, wherein
the sprocket arrangement comprises a common sprocket for both the first linear force transmission element and the second linear force transmission element, or the sprocket arrangement comprises a first sprocket for the first linear force transmission element and a second sprocket for the second linear force transmission element, the second sprocket being axially offset in relation to the first sprocket.

7. The fluid switch-over device according to claim 6, wherein when the sprocket arrangement comprises a first sprocket and a second sprocket, the first sprocket and the second sprocket have opposed sawtooth-type toothed profiles.

8. The fluid switch-over device according to claim 3, wherein the actuation device comprises at least one elastic return element exerting an elastic return force on at least one of the first linear force transmission element and the second force transmission element towards an initial position.

9. The fluid switch-over device according to claim 1, wherein the actuation device is configured for generating a switch-over sound for signaling actuation upon actuation of the respective operating element of the first actuation element and the second actuation unit and corresponding change of the operating position of the switch-over body.

10. A fluid switch-over device, comprising:
at least one fluid inlet and at least two fluid outlets;
a movable switch-over body for controlling fluid connections of the at least two fluid outlets to the at least one fluid inlet, wherein the switch-over body is switchable between at least three different operating positions; and
an actuation device, configured for sequential and bidirectional switching-over actuation of the switch-over body both in a forward switch-over direction and in a backward switch-over direction inverse to the forward switch-over direction;
wherein the actuation device comprises a first actuation unit for sequential switching-over actuation of the switch-over body in the forward switch-over direction and a second actuation unit for sequential switching-over actuation of the switch-over body in the backward switch-over direction;
wherein the first actuation unit and the second actuation unit include operating elements that are user-operable independently of each other; and
wherein the actuation device comprises a sliding guide mechanism with cooperating sliding guide elements on the switch-over body, and on a part of the fluid switch-over device that is stationary in relation to the switch-over body, wherein the sliding guide elements are movable relative to each other between stable positions, which define the operating positions of the switch-over body.

11. A sanitary shower device, comprising:
a shower housing having a shower inlet and a shower head including at least two groups of shower jet output openings arranged fluidically in parallel; and
a fluid switch-over device for controlling fluid supply from the shower inlet to the fluidically in parallel arranged groups of shower jet output openings, the fluid switch-over device including:
at least one fluid inlet and at least two fluid outlets,
a movable switch-over body for controlling fluid connections of the at least two fluid outlets to the at least one fluid inlet, wherein the switch-over body is switchable between at least three different operating positions, and
an actuation device, configured for sequential and bidirectional switching-over actuation of the switch-over body both in a forward switch-over direction and in a backward switch-over direction inverse to the forward switch-over direction,
wherein the actuation device comprises a first actuation unit for sequential switching-over actuation of the switch-over body unidirectionally in the forward switch-over direction and a second actuation unit for sequential switching-over actuation of the switch-over body unidirectionally in the backward switch-over direction, and
wherein the first actuation unit and the second actuation unit include operating elements that are user-operable independently of each other so that switching-over actuation of the switch-over body in the forward switch-over direction is accomplished by user-operating the operating element included in the first actuation unit only, while not by user-operating the operating element included in the second actuation unit, and switching-over actuation of the switch-over body in the backward switch-over direction is accomplished by user-operating the operating element included in the second actuation unit only, while not by user-operating the operating element included in the first actuation unit.

12. The sanitary shower device according to claim 11, wherein the switch-over body is disposed within the shower head, and the operating elements, that are user-operable independently of each other, are disposed mutually adjacent on the shower housing.

13. The sanitary shower device according to claim 11, wherein the operating elements of the first actuation unit and the second actuation unit are operating elements responding to operating pressure.

14. The sanitary shower device according to claim 11, wherein the first actuation unit includes a first linear force transmission element and the second actuation unit includes a second linear force transmission element, wherein the first linear force transmission element and the second linear force transmission element are coupled to a respective one of the operating elements of the first actuation unit and the second actuation unit, and to the switch-over body, and have opposite directions of action on the switch-over body.

15. The sanitary shower device according to claim 14, wherein the switch-over body is rotatably movable about a rotation axis and the directions of action of the first linear force transmission element and the second linear force transmission element on the switch-over body are opposed directions of rotation.

16. The sanitary shower device according to claim 15, wherein the switch-over body comprises a sprocket arrangement, and the first linear force transmission element and the second linear force transmission element cooperate with the sprocket arrangement on opposite sides in relation to a central longitudinal plane including the rotation axis of the switch-over body, wherein each of the first linear force transmission element and the second linear force transmission element is in engagement with the sprocket arrangement during a forward movement of the switch-over body for rotating and is in disengagement during a backward movement opposite to the forward movement.

17. The sanitary shower device according to claim 14, wherein the actuation device comprises at least one elastic return element exerting an elastic return force on at least one of the first linear force transmission element and the second force transmission element towards an initial position.

18. The sanitary shower device according to claim 11, wherein the actuation device comprises a sliding guide mechanism with cooperating sliding guide elements on the switch-over body, and on a part of the fluid switch-over device that is stationary in relation to the switch-over body, wherein the sliding guide elements are movable relative to each other between stable positions, which define the operating positions of the switch-over body.

\* \* \* \* \*